(12) United States Patent
Miyazaki et al.

(10) Patent No.: US 9,931,705 B2
(45) Date of Patent: Apr. 3, 2018

(54) PROCESS FOR FABRICATING INDUCTIVE HEATED SOLDER CARTRIDGE

(71) Applicants: Mitsuhiko Miyazaki, Osaka (JP); Hisao Nemoto, Osaka (JP)

(72) Inventors: Mitsuhiko Miyazaki, Osaka (JP); Hisao Nemoto, Osaka (JP)

(73) Assignee: Hakko Corp., Osaka (JP)

( * ) Notice: Subject to any disclaimer, the term of this patent is extended or adjusted under 35 U.S.C. 154(b) by 844 days.

(21) Appl. No.: 14/032,616

(22) Filed: Sep. 20, 2013

(65) Prior Publication Data

US 2015/0083707 A1 Mar. 26, 2015

(51) Int. Cl.
*B23K 3/03* (2006.01)
*B23K 3/047* (2006.01)
*F27D 7/06* (2006.01)

(52) U.S. Cl.
CPC .............. *B23K 3/0353* (2013.01); *B23K 3/03* (2013.01); *B23K 3/0369* (2013.01); *B23K 3/0475* (2013.01); *F27D 7/06* (2013.01); *Y10T 29/4902* (2015.01); *Y10T 29/49885* (2015.01)

(58) Field of Classification Search
CPC .... B23K 1/002; B23K 3/0478; B23K 3/0353; B23K 3/03; B23K 3/0369; B23K 3/0475

USPC ..... 219/229, 236, 238, 616, 617; 228/33, 51
See application file for complete search history.

(56) References Cited

U.S. PATENT DOCUMENTS

| | | | |
|---|---|---|---|
| 4,745,264 A * | 5/1988 | Carter | B23K 3/0475 219/229 |
| 5,329,085 A | 7/1994 | Cowell | |
| 2005/0011876 A1 * | 1/2005 | Uetani | B22F 7/064 219/229 |

FOREIGN PATENT DOCUMENTS

| | | |
|---|---|---|
| EP | A1586402 | 10/2005 |
| JP | 06-087070 | 3/1994 |
| JP | 2005-169437 | 6/2005 |
| WO | WO2004048024 | 11/2003 |

* cited by examiner

*Primary Examiner* — Brian Jennison
(74) *Attorney, Agent, or Firm* — David B Abel

(57) ABSTRACT

A method or process of fabricating a solder cartridge and solder cartridge made according to the process is disclosed. The solder cartridge made according to the process provides a self-temperature regulating solder tip for an inductive current soldering station having improved heater quality and stability with reduced manufacturing costs.

20 Claims, 5 Drawing Sheets

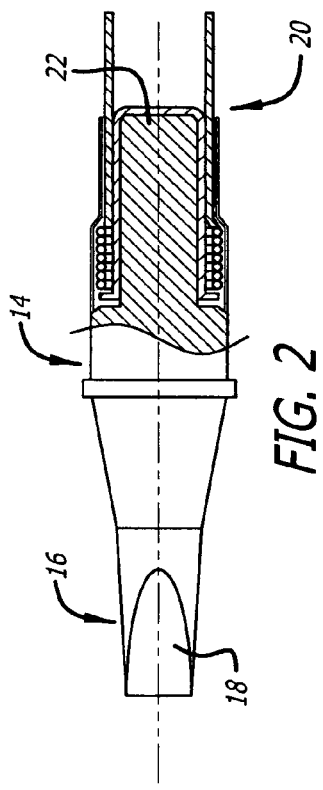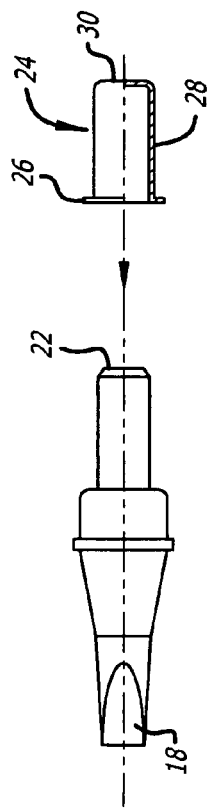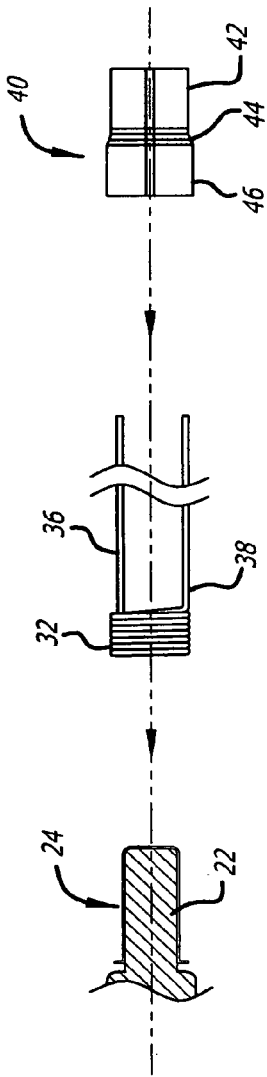

PROCESS FOR FABRICATING INDUCTIVE HEATED SOLDER CARTRIDGE

BACKGROUND OF THE INVENTION

There are a number of different types of industrial and hobbyist soldering stations presently available. In this field, temperature control of the soldering tip is a critical function impacting the quality of the solder joint. Many types of solder materials are available that have different melt temperatures and physical properties to match to particular applications. Soldering also utilizes a number of different types of chemical formulations that aid the soldering process, including fluxes and cleaning agents. Due to the high temperatures, corrosive materials and different metals, the process of soldering is inherently destructive to the solder tip located at the most distal end of a solder cartridge attached to a solder station. Thus, a number of solder stations and solder handles have been offered with removable solder cartridges that can be swapped out to provide different shapes for specific types of solder tasks, as well as to ease replacement.

For many applications, the size of the solder tip allows constructions having a heater element and temperature sensor located internally to the solder tip. The temperature sensor provides a feedback of the temperature of the tip to a solder station that can adjust the power delivery to the heater element to maintain a desired temperature level. One structure for providing a temperature sensor at the solder tip is described in U.S. Pat. No. 7,679,032, assigned to the assignee of the present invention, herein incorporated by reference.

However, for some types of detail or fine solder work, the size of the tip is constrained and as a result the structural constraints do not allow the placement of a temperature sensor at the solder tip. For these types of requirements, temperature control of the solder tip may be provided by taking advantage of the Currie point of ferromagnetic materials to provide self-regulating temperature control using an inductive current heating method. Configurations of different inductive current self-regulating soldering tips, and the underlying principle of operation, are disclosed in expired U.S. Pat. Nos. 4,256,945 and 4,745,264.

SUMMARY OF THE INVENTION

The present invention is directed to method of forming the ferromagnetic heater element and configurations of various heater elements formed thereby allowing the fabrication of replaceable solder tips for use with an inductive current solder station to provide improved self-regulating temperature solder tips for a range of solder temperature applications. A preferred or exemplary embodiment is discussed in the context of forming the ferromagnetic heater element that may be used with various configurations of soldering iron tips and de-soldering nozzles. The ferromagnetic heater elements are formed using a punch press that stamps a flat sheet of ferromagnetic material forming a cap in the general configuration of tiny stove pipe top hat. The heater element is configured to be placed over and brazed to a copper core extending from the proximal side of the solder tip. An inductor coil is wound or placed around the heater element before being confined within an electromagnetic shield element. Specific self-regulated temperatures can be obtained by varying the percentage of nickel in the ferromagnetic material of the heater element, whereby all other components of the solder tip assembly are interchangeable.

BRIEF DESCRIPTION OF THE FIGURES

The following drawings are not necessarily to scale, emphasis instead being placed generally upon illustrating the principles of the invention. The foregoing and other features and advantages of the present invention, as well as the invention itself, will be more fully understood from the following description of preferred and exemplary embodiments, when read together with the accompanying drawings, in which:

FIG. 2 is a partial cross sectional view of the distal portion of the heater cartridge assembly of FIG. 1;

FIG. 3 is an exploded view of the components of the distal end of the heater cartridge assembly;

DETAILED DESCRIPTION

Figure 1:
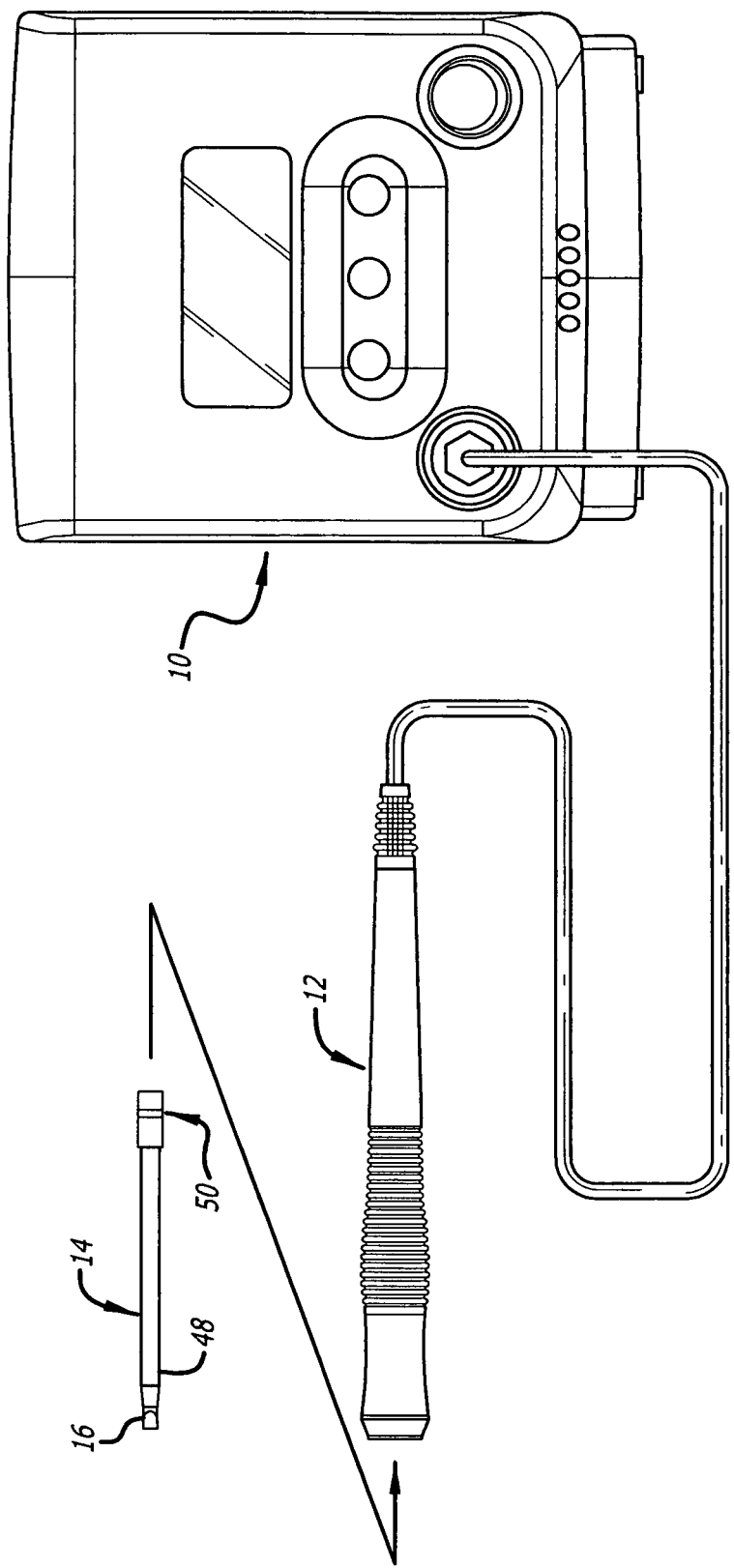
FIG. 1 depicts a solder station, handle and a heater cartridge assembly having an exemplary solder tip.

FIG. 1 illustrates a soldering station 10 connected to a handle 12 for receiving a heater cartridge assembly 14 having an exemplary solder tip 16. The cartridge assembly 14 may be removed and replaced with another cartridge assembly 14 as the solder tip 16 wears out or when a different solder tip configuration is better suited for a particular soldering operation. The solder station 10 provides a high frequency AC current to the heater cartridge assembly 14. In a preferred embodiment, the solder station 10 provides a 13.56 MHz AC current to the heater cartridge assembly 14.

The components of the distal portion of the heater cartridge assembly 14 are described with reference to FIG. 2 which provides a partial cross sectional view of the distal portion of the heater cartridge assembly 14 and FIG. 3 which provides an exploded view of the components of the distal end of the heater cartridge assembly 14. The solder tip 16 has a distal end-face 18 that as depicted defines a double sided flat solder face configuration. It should be appreciated that this specific configuration of the shape of the solder face is exemplary and other shapes including pointed, circular, bent tip or flat iron faces may be incorporated. The proximal end 20 of the solder tip 16 has a projecting core 22 having a generally cylindrical shape. The solder tip 16 is preferably fabricated from cast or machined copper, sintered copper, copper alloy, silver or a silver alloy with the distal end face 18 being coated with a thin layer of iron, iron alloy, sintered iron, nickel and cobalt or alloys of two or more of these materials.

As shown in FIGS. 2 and 3, a heater element 24 is configured to fit over the entirety of the projecting core 22 of the solder tip 16. The heater element 24 has a small flange 26, a central cylinder section 28 and a flat end 30. The heater element 24 is configured to fit snuggly over and be brazed onto the projecting core 22 of the solder tip 16. A coil winding 32, having lead wires 36 and 38, is either wrapped around the heater element 24 or formed separately and then inserted over the heater element 24. A shield 40 is then installed over the coil winding 32 and the core 22 as well as a portion of the solder tip 16, and together with the heater element 24, forms a magnetic barrier enclosing the coil winding 32 to provide containment for the electromagnetic field produced by the coil winding 32. The shield 40 may thus include a first cylindrical section 42, a tapered section 44 and a second cylindrical section 46. The solder tip 16, heater element 24, coil winding 32 and shield 40 when combined form a tip assembly. The proximal end 20 of the tip assembly is inserted into the distal end of a cylindrical sleeve 48 (FIG. 1) with the lead wires 36 and 38 extending axially there through to a connector assembly 50 at the proximal end of sleeve 48. The proximal end of sleeve 48 includes a connector assembly 50 of known design intended to be inserted into an axial opening within the handle 12, and provide electrical contacts for connecting the coil winding 42 to the power source of solder station 10.

Figure 4:
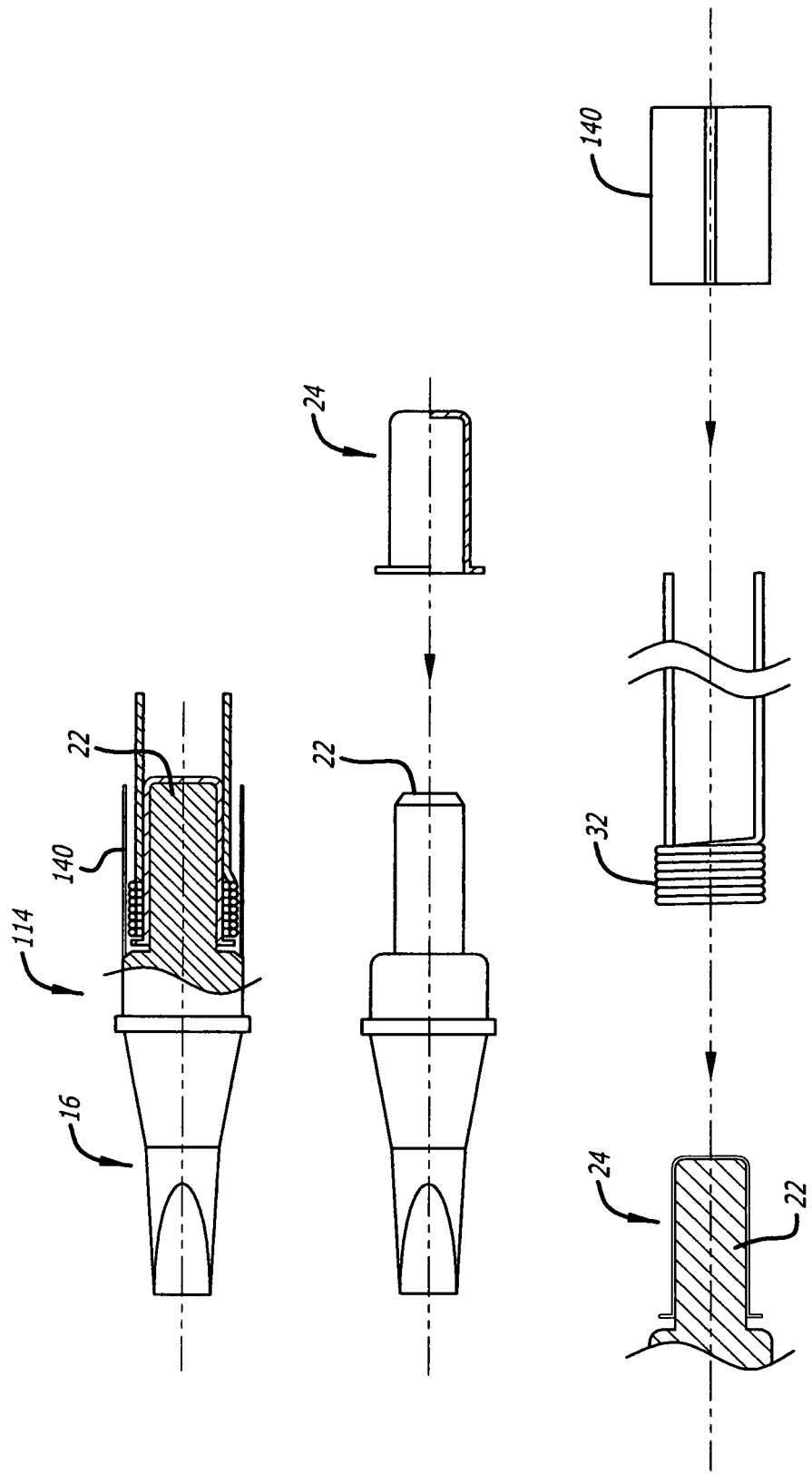
FIG. 4 is an exploded view of the components of the distal end of an alternative construction of a heater cartridge assembly.

The alternative construction of a heater cartridge assembly 114 is depicted in FIG. 4. The heater cartridge assembly 114 has an identical construction for the solder tip 16 with the projecting core 22, the heater element 24 and coil winding 32. The primary difference is the shape of the shield 140, which is a cylinder of constant diameter as opposed to having the stepped configuration of the shield 40 of the heater cartridge assembly 14 of FIGS. 2 and 3. The constant diameter cylindrical shield 140 is simpler to fabricate and install over the coil winding 32, without degrading the stray electromagnetic shield performance.

The solder tip 16 may be machined or formed by casting or sintering copper, a copper alloy, silver or a silver alloy and then the exposed distal tip is coated for example with iron or an iron alloy by a known process such as plating, sintering or vapor deposition.

The heater element 24 is formed from a sheet of iron-nickel alloy material that is processed by forming the net shape in a punch press. In an exemplary embodiment, a sheet of iron-nickel alloy material having a thickness of 0.12 mm is punch pressed to form the heater element 24 having a wall thickness of 0.1 mm. As a result of the punch press forming process, the magnetic properties of the iron-nickel alloy material are degraded. The magnetic properties are preferably restored by a heat treating or annealing process. The annealing process is carried out in a hydrogen atmosphere oven wherein the heater element 24 is heated to a temperature between 1050 to 1200 degrees centigrade (1050-1200° C.) for at least twenty minutes and up to about four hours, then gradually cooled. The heater element 24 preferably has a wall thickness in the range of from 0.05 mm to 0.15 mm, which provides optimal temperature control when powered by the 13.56 MHz power supply.

Figure 5:
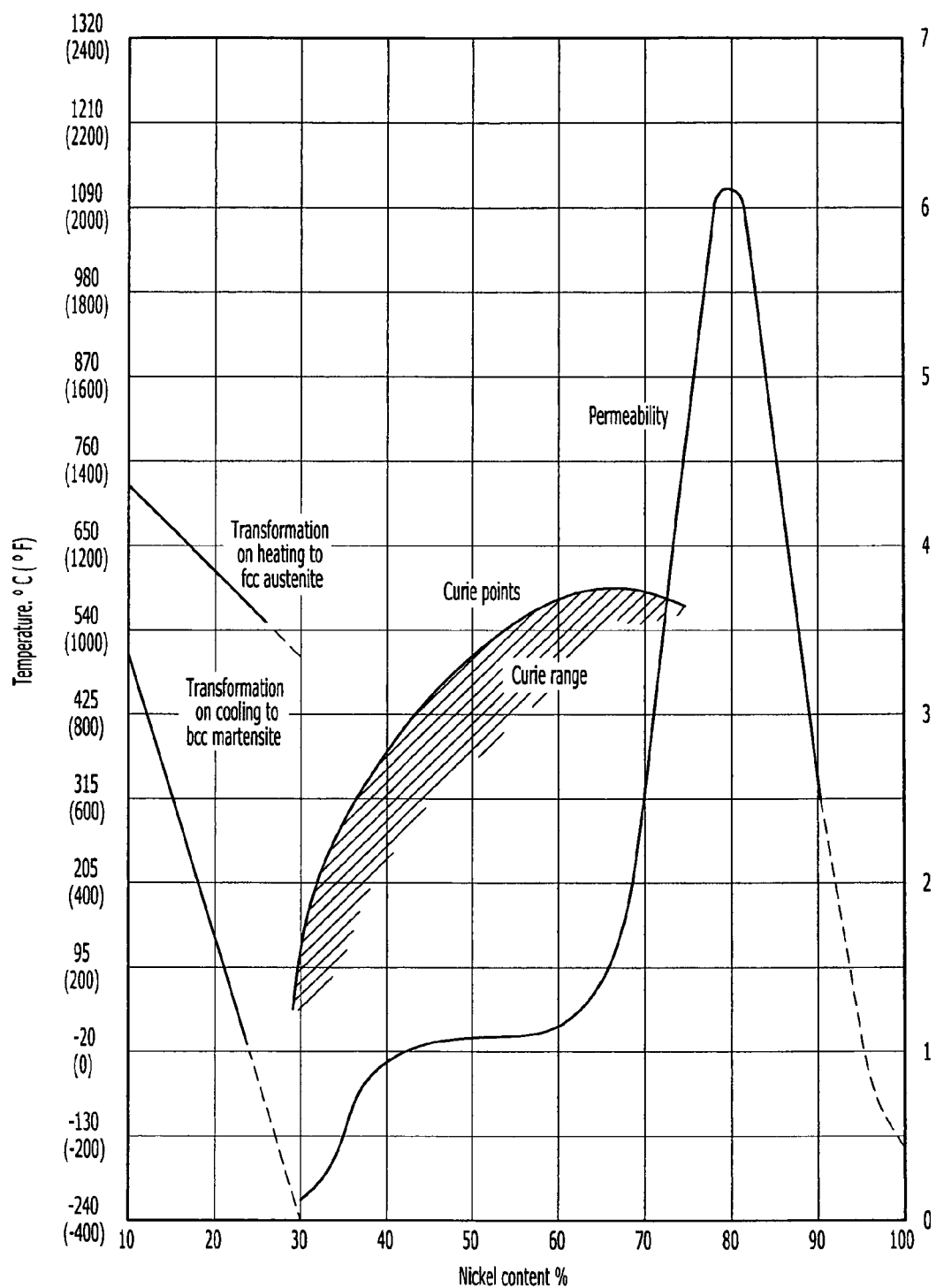
FIG. 5 is a temperature v. nickel content graph showing the Currie point of various iron-nickel compositions that may be used to form the ferromagnetic heater element depicted in FIGS. 2, 3 and 4.

The temperature of the solder tip 16 is controlled by the Currie point temperature of the iron-nickel alloy of the heater element 24 when excited by the coil winding 32 energized by the solder station. FIG. 5 provides a temperature v. nickel content graph showing the Currie point of various iron-nickel compositions that may be used to form the ferromagnetic heater element 24 shown in FIG. 3 and FIG. 4. With the benefit of the information provided in the graph of FIG. 5, a variety of self-regulated temperature heater cartridge assemblies 14 for a single solder station may be formed by varying the nickel content of the iron-nickel alloy of the heater element 24. Accordingly, for the preferred range of solder tip temperatures, the nickel content by weight percentage for desired heater temperatures is provided in the flowing chart:

| % nickel (by weight) | Curie Temperature ° F. | Curie Temperature ° C. |
|---|---|---|
| 32% | 500° F. | 260° C. |
| 36% | 536° F. | 280° C. |
| 39% | 644° F. | 340° C. |
| 42% | 716° F. | 380° C. |
| 45% | 824° F. | 440° C. |
| 46% | 860° F. | 460° C. |
| 48% | 900° F. | 480° C. |
| 50% | 968° F. | 520° C. |
| 52% | 1004° F. | 540° C. |

As noted above, the coil winding 32 may be formed on the heater element 24 or pre-wound and then inserted over the heater element 24 forming an inductor. In preferred embodiments, the coil winding 32 has 13.5 to 18.5 turns in 2 layers formed from an insulated silver, copper or nickel plated copper (NPC) wire having a wire diameter of between about 0.15 mm and 0.25 mm and preferable about 0.2 mm. The resulting coil winding 32 has an impedance (Z) in the range of between 15 ohms and 30 ohms when excited by a 5 MHz AC current at room temperature.

The shield 40 and shield 140 are preferably made from iron or an iron alloy and have a total thickness in the range of from about 0.03 mm to 0.15 mm. The shield 40 may be formed as a pair of cylinders joined in the central portion or it may be formed from a thin sheet that is wrapped around the proximal end of the solder tip 16. The cylindrical sleeve 48 is preferably a cylinder formed from a thermally non-conductive material such as stainless steel.

The construction of the tip assembly for the heater cartridge assembly 14 provided herein provides an optimal heat transfer to the distal end of the solder tip 16. The high frequency AC current applied to the coil winding 32 and the resulting rapidly oscillating magnetic field induced in the heater element 24 causes eddy currents to flow and joule heating. Brazing the heater element 24 to the integrally formed projecting core 22 of the solder tip 16 creates a large surface area for heat transfer from the heater element 24 to the projecting core 22, and being formed of a high thermal conductivity copper or copper alloy material, the solder tip 16 is uniformly and efficiently heated to the Currie point temperature of the ferromagnetic material from which the heater element 24 is formed.

The construction of the tip assembly for the heater cartridge assembly 14 provided herein is also beneficial in providing lower manufacturing costs with the ability to change the self-regulated tip temperature by proper selection of the material for the heater element 24, with the constructions of the solder tip 16, coil winding 32 and shields 40 or 140 being consistent across an entire spectrum of tip temperatures. Further, stamping the heater element 24 from a sheet of material provides enhanced quality control for the shape and thickness of the ferromagnetic material forming the heater element 24 while also being less expensive as compared to a core formed separate from the tip that has a ferromagnetic coating adhered to the core. Finally, the structures of the solder tip 16, heater element 24, coil winding 32 and shield 40 when combined as described herein allow precise control over the placement of the coil winding 32 on the heater element 24, and constraint of the coil winding 32 by the tapered section 44 of the shield 40, which increases the uniformity of the manufacturing process whereby the resulting tip temperature is consistent among heater cartridge assemblies 14 having the same material forming the heater element 24.

Figure 6:
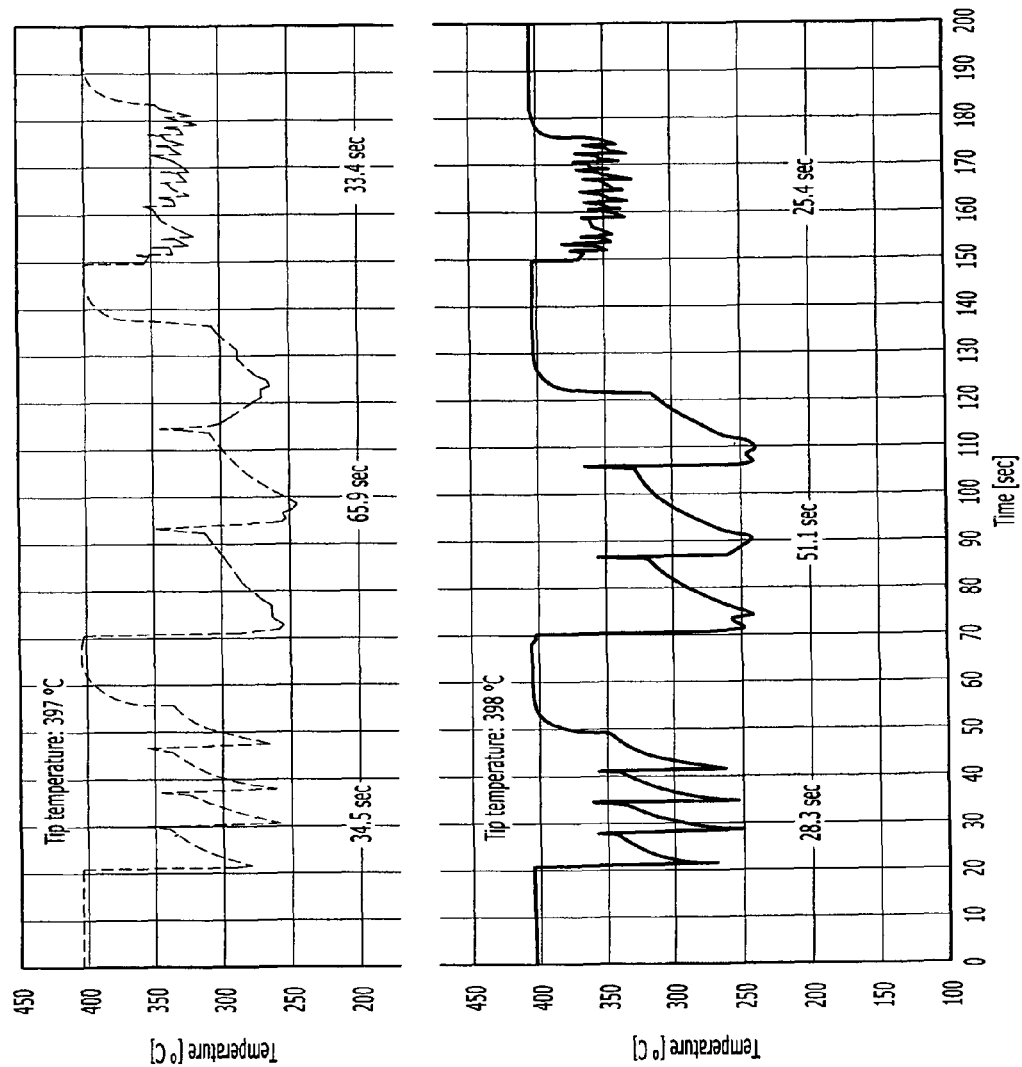
FIG. 6 is a pair of temperature v. time graphs showing the operation and temperature recovery of a cartridge according to the present invention and a prior art cartridge.

To illustrate the enhanced performance of the solder cartridges according to the present invention, FIG. 6 presents a pair of temperature v. time graphs showing the operation and temperature recovery of the solder cartridge according to the present invention and a prior art solder cartridge. For these graphs, a solder cartridge according to the present invention was compared to a Metcal and Oki International "SmartHeat" solder cartridge as described at www.okinternational.com and available from Oki International located at 12151 Monarch Street, Garden Grove, Calif., U.S.A. The Metcal solder cartridge had a double sided flat solder face configuration at the distal end generally identical to that depicted in FIGS. 1-3 herein. In the Metcal cartridge, the solder tip had a proximal cavity into which a core including a ferromagnetic coating was inserted and then surrounded by an excitation coil.

In the pair of temperature v. time comparison graphs of FIG. 6, the performance of the Metcal solder cartridge is depicted in the top graph and the performance of the solder cartridge according to the present invention is depicted in the bottom graph. In each graph, the solder tip is allowed to heat to its design temperature and then used for an identical sequence of soldering tasks. As shown in the graphs, the solder cartridge of the present invention exhibits a faster temperature recovery profile for each of the solder tasks.

Those skilled in the art will readily appreciate that the disclosure herein is meant to be exemplary and actual parameters depend upon the specific application for which the process and materials of the present invention are used. It is, therefore, to be understood that the foregoing embodiments are presented by way of example only and that, within the scope of the appended claims and equivalents thereto; the invention may be practiced otherwise than as specifically described.

The invention claimed is:

1. A process for fabricating a heater cartridge assembly for use with an inductive coupling solder station, the process comprising:
   forming a solder tip having a distal end defining a soldering surface and a proximal end defining a projecting core;
   forming a heater element of a ferromagnetic material by a press punch process to shape said heater element to fit over said projecting core of said solder tip;
   brazing said heater element to said projecting core;
   installing a coil winding over said heater element;
   installing a shield over said coil winding, heater element and proximal end of said solder tip to form a solder tip assembly; and
   inserting said solder tip assembly into a distal end of a thermally nonconductive sleeve and connecting said coil winding to a connector assembly at a proximal end of said sleeve.

2. The process of claim 1, further comprising:
   forming said solder tip from a material selected from the group consisting of cast or machined copper, sintered copper, copper alloy, silver or a silver alloy; and
   forming said heater element from an iron-nickel alloy.

3. The process of claim 1, further comprising:
   forming said heater element from a sheet of iron-nickel alloy material in the press punch process so that the thickness of the heater element is in the range of from between about 0.05 mm and 0.15 mm.

4. The process of claim 1, further comprising:
   heat treating said heater element before installation on said projecting core in a hydrogen atmosphere oven at a temperature between 1050 to 1200 degrees Centigrade.

5. The process of claim 1 further comprising:
   coating said distal end of said solder tip with a material selected from the group consisting of iron, iron alloy, sintered iron, nickel and cobalt and alloys thereof; and
   said ferromagnetic heater element formed using a punch press that stamps a flat sheet of ferromagnetic material forming a cap in the general configuration of tiny stovepipe top hat.

6. The process of claim 1, further comprising:
   forming said coil winding to have between 13.5 to 18.5 turns in two layers formed from an insulated silver, copper or nickel plated copper wire having a diameter of about 0.2 mm.

7. The process of claim 1, further comprising:
   forming said coil winding from an insulated silver, copper or nickel plated copper wire having a diameter of between about 0.15 and 0.25 mm.

8. The process of claim 1, further comprising:
   forming said heater element from a sheet of iron-nickel alloy material having a nickel content of about thirty two percent by weight to provide a self-regulating about 260° Celsius temperature heater cartridge assembly when excited by a high frequency AC current solder station.

9. The process of claim 1, further comprising:
   forming said heater element from a sheet of iron-nickel alloy material having a nickel content of about thirty six percent by weight to provide a self-regulating about 280° Celsius temperature heater cartridge assembly when excited by a high frequency AC current solder station.

10. The process of claim 1, further comprising:
    forming said heater element from a sheet of iron-nickel alloy material having a nickel content of about thirty nine percent by weight to provide a self-regulating about 340° Celsius temperature heater cartridge assembly when excited by a high frequency AC current solder station.

11. The process of claim 1, further comprising:
    forming said heater element from a sheet of iron-nickel alloy material having a nickel content of about forty two percent by weight to provide a self-regulating about 380° Celsius temperature heater cartridge assembly when excited by a high frequency AC current solder station.

12. The process of claim 1, further comprising:
    forming said heater element from a sheet of iron-nickel alloy material having a nickel content of about forty five percent by weight to provide a self-regulating about 440° Celsius temperature heater cartridge assembly when excited by a high frequency AC current solder station.

13. The process of claim 1, further comprising:
    forming said heater element from a sheet of iron-nickel alloy material having a nickel content of about forty six percent by weight to provide a self-regulating about 460° Celsius temperature heater cartridge assembly when excited by a high frequency AC current solder station.

14. The process of claim 1, further comprising:
    forming said heater element from a sheet of iron-nickel alloy material having a nickel content of about forty eight percent by weight to provide a self-regulating about 500° Celsius temperature heater cartridge assembly when excited by a high frequency AC current solder station.

15. The process of claim 1, further comprising:
forming said heater element from a sheet of iron-nickel alloy material having a nickel content of about fifty percent by weight to provide a self-regulating about 520° Celsius temperature heater cartridge assembly when excited by a high frequency AC current solder station.

16. The process of claim 1, further comprising:
forming said heater element from a sheet of iron-nickel alloy material having a nickel content of about fifty two percent by weight to provide a self-regulating about 540° Celsius temperature heater cartridge assembly when excited by a high frequency AC current solder station.

17. A heater cartridge assembly for use with an inductive coupling solder station, said heater cartridge assembly formed by the process comprising:
forming a solder tip having a distal end defining a soldering surface and a proximal end defining a projecting core;
forming a heater element of a ferromagnetic material by a press punch process to shape said heater element to fit over said projecting core of said solder tip;
brazing said heater element to said projecting core;
installing a coil winding over said heater element;
installing a shield over said coil winding, heater element and proximal end of said solder tip to form a solder tip assembly; and
inserting said solder tip assembly into a distal end of a thermally nonconductive sleeve and connecting said coil winding to a connector assembly at a proximal end of said sleeve.

18. The heater cartridge assembly of claim 17, wherein the process further comprises:
forming said solder tip from a material selected from the group consisting of cast or machined copper, sintered copper, copper alloy, silver or a silver alloy;
forming said heater element from a sheet of iron-nickel alloy material in the press punch process so that the thickness of the heater element is in the range of from between about 0.05 mm and 0.15 mm;
forming said coil winding to have between 13.5 to 18.5 turns in two layers formed from an insulated silver or copper wire having a diameter of about 0.2 mm; and
heat treating said heater element before installation on said projecting core in a hydrogen atmosphere oven at a temperature of between 1050 to 1200 degrees Celsius.

19. The heater cartridge assembly of claim 18, wherein the process further comprises: forming said heater element from a sheet of iron-nickel alloy material, the nickel content and respective self-regulating tip temperature being selected from the group consisting of:

a nickel content of about thirty two percent by weight to provide a self-regulating about 260° Celsius temperature heater cartridge assembly;
a nickel content of about thirty six percent by weight to provide a self-regulating about 280° Celsius temperature heater cartridge assembly;
a nickel content of about thirty nine percent by weight to provide a self-regulating about 340° Celsius temperature heater cartridge assembly;
having a nickel content of about forty two percent by weight to provide a self-regulating about 380° Celsius temperature heater cartridge assembly;
a nickel content of about forty five percent by weight to provide a self-regulating about 440° Celsius temperature heater cartridge assembly;
a nickel content of about forty six percent by weight to provide a self-regulating about 460° Celsius temperature heater cartridge assembly;
a nickel content of about forty eight percent by weight to provide a self-regulating about 500° Celsius temperature heater cartridge assembly;
a nickel content of about fifty percent by weight to provide a self-regulating about 520° Celsius temperature heater cartridge assembly; and
a nickel content of about fifty two percent by weight to provide a self-regulating about 540° Celsius temperature heater cartridge assembly.

20. A process for fabricating a heater cartridge assembly for use with an inductive coupling solder station, the process comprising:
forming a solder tip from a material selected from the group consisting of cast or machined copper, sintered copper, copper alloy, silver or a silver alloy, said solder tip having a distal end defining a soldering surface and a proximal end defining a projecting core;
forming a heater element from a sheet of iron-nickel ferromagnetic alloy material by a press punch process to shape said heater element to fit over said projecting core of said solder tip so that the thickness of the heater element is in the range of from between about 0.05 mm and 0.15 mm;
heat treating said heater element in a hydrogen atmosphere oven;
brazing said heater element to said projecting core;
installing a coil winding over said heater element, said coil winding having between 13.5 to 18.5 turns in two layers formed from an insulated silver, copper or nickel plated copper wire having a diameter between about 0.15 mm and 0.25 mm;
installing a shield over said coil winding, heater element and proximal end of said solder tip to form a solder tip assembly; and
inserting said solder tip assembly into a distal end of a sleeve and connecting said coil winding to a connector assembly at a proximal end of said sleeve.

* * * * *